US009280659B2

(12) United States Patent
Rozas et al.

(10) Patent No.: US 9,280,659 B2
(45) Date of Patent: Mar. 8, 2016

(54) METHODS AND APPARATUS FOR REMEASURING A VIRTUAL MACHINE MONITOR

(75) Inventors: Carlos V. Rozas, Portland, OR (US); Vincent R. Scarlata, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 2421 days.

(21) Appl. No.: 11/648,103

(22) Filed: Dec. 29, 2006

(65) Prior Publication Data

US 2008/0163209 A1 Jul. 3, 2008

(51) Int. Cl.
*H04L 29/06* (2006.01)
*G06F 21/53* (2013.01)
*G06F 9/455* (2006.01)
*G06F 21/57* (2013.01)

(52) U.S. Cl.
CPC ............ *G06F 21/53* (2013.01); *G06F 9/45558* (2013.01); *G06F 9/45533* (2013.01); *G06F 21/57* (2013.01); *G06F 21/575* (2013.01); *G06F 2009/45587* (2013.01)

(58) Field of Classification Search
CPC .... G06F 21/57; G06F 21/575; G06F 9/45533
USPC ......................................................... 713/155
See application file for complete search history.

(56) References Cited

U.S. PATENT DOCUMENTS

| | | | |
|---|---|---|---|
| 7,076,655 B2 | 7/2006 | Griffin et al. | |
| 7,222,062 B2 | 5/2007 | Goud et al. | |
| 7,380,119 B2 | 5/2008 | Bade et al. | |
| 2002/0193615 A1 | 12/2002 | Aksela | |
| 2002/0194482 A1 | 12/2002 | Griffin et al. | |
| 2003/0115453 A1 | 6/2003 | Grawrock | |
| 2004/0103299 A1* | 5/2004 | Zimmer ................. | G06F 21/57 726/26 |

(Continued)

FOREIGN PATENT DOCUMENTS

WO 02/06929 A2 1/2002

OTHER PUBLICATIONS

Intel Corp., New Client Virtualization Usage Models Using Intel Virtualization Technology, Intel Technology Journal, vol. 10, Issue 03, Aug. 10, 2006, cover p. & 204-217.

(Continued)

*Primary Examiner* — Ashok Patel
*Assistant Examiner* — Lawrence Cosby
(74) *Attorney, Agent, or Firm* — Trop, Pruner & Hu, P.C.

(57) ABSTRACT

A data processing system supports remeasurement of a virtual machine monitor (VMM). In one example process, the VMM may obtain a secret value from a trusted platform module (TPM) of the processing system. The VMM may provide the secret value from the VMM to a measurement agent executing in system management mode (SMM) of the processing system. The measurement agent may be a system management interrupt (SMI) transfer monitor (STM) that can create virtual machines to execute in SMM, for example. However, the VMM may verify the measurement agent before providing the secret value to the measurement agent. The measurement agent may generate a remeasurement value for the VMM, use the secret value that was obtained from the TPM to certify the remeasurement value, and communicate the remeasurement value to a requesting program, via the VMM. Other embodiments are described and claimed.

18 Claims, 2 Drawing Sheets

(56) References Cited

U.S. PATENT DOCUMENTS

| | | | |
|---|---|---|---|
| 2004/0264797 | A1 | 12/2004 | Lippincott et al. |
| 2005/0132122 | A1 | 6/2005 | Rozas |
| 2005/0223221 | A1* | 10/2005 | Proudler et al. ............. 713/164 |
| 2005/0286792 | A1 | 12/2005 | Tadas et al. |
| 2006/0002471 | A1 | 1/2006 | Lippincott et al. |
| 2006/0020781 | A1 | 1/2006 | Scarlata et al. |
| 2006/0085630 | A1* | 4/2006 | Challener et al. ................. 713/2 |
| 2006/0140501 | A1 | 6/2006 | Tadas |
| 2006/0230401 | A1 | 10/2006 | Grawrock |
| 2006/0236125 | A1 | 10/2006 | Sahita et al. |
| 2006/0256105 | A1 | 11/2006 | Scarlata et al. |
| 2006/0256106 | A1 | 11/2006 | Scarlata et al. |
| 2006/0256107 | A1 | 11/2006 | Scarlata et al. |
| 2006/0256108 | A1 | 11/2006 | Scaralata |
| 2007/0094719 | A1 | 4/2007 | Scarlata |

OTHER PUBLICATIONS

Vincent R. Scarlata, "Method and Apparatus for Migrating Virtual Trusted Platform Modules", U.S. Appl. No. 11/512,989, filed Aug. 29, 2006.

Mario Strasser, "A Software-based TPM Emulator for Linux", Semester Thesis, Eidgenssische Technische Hochschule Zurich, Jul. 2004, Zurich, Switzerland, 52 pgs.

Reiner Sailer et al., "Design and Implementation of a TCG-based Integrity Measurements Architecture", Proceedings of the 13th USENIX Security Symposium, San Diego, CA, Aug. 9-13, 2004, 20 pgs.

John Marchesini et al., "Experimenting with TCPA/TCG Hardware, or: How I Learned to Stop Worrying and Love the Bear", Computer Science Tech Report TR2003-476, Dept. of Computer Science, Dartmouth PKI Lab Dartmouth College, Hanover, New Hampshire, Version of Dec. 15, 2003, 22 pgs.

Charles S. Powell et al., "Foundations for Trusted Computing", Infineon Technologies AG, London, England, Nov. 7, 2002, 87 pgs. http://ieeexplore.ieee.org/ie15/2/20660/00955100.pdf?arnumber=955100—"Building the IBM 4758 Secure Coprocessor".

Michael M. Swift et al., "Improving the Reliability of Commodity Operating Systems", Proceedings of the 13th USENIX Security Symposium, San Diego, CA, Aug. 9-13, 2004, 18 pgs.

Tal Garfinkel et al., "TERRA—A Virtual Machine-Based Platform for Trusted Computing", (Article), SOSP '03, Oct. 19-22, 2003, 16 pgs.

Ahmad-Reza Sadeghi et al., "Property-based Attestation for Computing Platforms: Caring about properties, not mechanisms", 2004, pp. 67-77.

George W. Dunlap et al., "ReVirt: Enabling Intrusion Analysis through Virtual-Machine Logging and Replay", Proceedings of the 2002 Symposium on Operating Systes Design and Implementation (OSDI), Dept. of Electrical Engineering and Computer Science, Univ. of Michigan, 14 pgs.

Keir Fraser et al., "Safe Hardware Access with the Xen Virtual Machine Monitor", 2004, 12 pgs. http://www.cl.cam.ac.uk/Research/SRG/netos/papers/2004-oasis-ngio.pdf.

Robert Meushaw et al., Tech Trend Notes, "NetTop—Commercial Technology in High Assurance Applications", Fall 2000, vol. 9, Edition 4, 12 pgs.

Tal Garfinkel et al., "TERRA—A virtual machine-based platform for trusted computing", (Presentation), Nov. 10, 2004, 26 pgs. http://www.stanford.edu/~talg/papers/SOSP03/terra.pdf.

Paul Barham et al., "Xen and the Art of Virtualization", SOSP '03, Oct. 19-22, 2003, Bolton Landing, NY, 16 pgs.

David Safford, "The Need for TCPA", IBM Research, Oct. 2002, 10 pgs., http://www.research.ibm.com/gsal/tcpa/why_tcpa.pdf.

TPM Main, Part 1: Design Principles, Specification Version 1.2, Revision 94, Mar. 29, 2006, Trusted Computing Group, TCG Published 2003-2006, 180 pgs.

N. Sumrall et al., Trusted Computing Group (TCG) and the TPM 1.2 Specification, Intel Developer Forum, 32 pgs.

http://www.trustedcomputinggroup.org/home—"What is the Trusted Computing Group", (internet home page), 2 pgs.

Trusted Computing Platform Alliance (TCPA) Main Specification, Version 1.1b, Trusted Computing Group, 2003, 332 pgs.

Applied Data Security Group, "Trusted GRUB", 3 pgs. http://www.prosec.rub.de/trusted_grub.html.

VMWare, "VMware Reinvents Enterprise Desktop Management and Security with Breakthrough New Product", 4 pgs. http://www.vmware.com/news/release/ace_announce.html.

Stefan Berger et al., "vTPM: Virtualizing the Trusted Platform Module", Security '06: 15th USENIX Security Symposium, pp. 305-320.

U.S. Appl. No. 11/206,547, filed Aug. 17, 2005—Virtualized Measurement Agent.

U.S. Appl. No. 11/513,963, filed Aug. 31, 2006—Dynamic Measurement of an Operating System in a Virtualized System.

N. Petroni et al—"Copilot—a Coprocessor-based Kernel Runtime Integrity Monitor" (http://www.usenix.org/publications/library/proceedings/sec04/tech/full_papers/petroni/petroni.pdf) Proceedings of the 13th USENIX Security Symposium, Aug. 9-13, 2004.

The Intel Safer Computing Initiative: Building Blocks for Trusted Computing—David Grawrock, Intel Press, Jan. 2006.

Intel® Trusted Execution Technology: Preliminary Architecture Specification, Intel Corp., Nov. 2006.

* cited by examiner

METHODS AND APPARATUS FOR REMEASURING A VIRTUAL MACHINE MONITOR

FIELD OF THE INVENTION

The present disclosure relates generally to the field of data processing, and more particularly to methods and related apparatus for remeasuring a virtual machine monitor.

BACKGROUND

A data processing system may include hardware resources, such as a central processing unit (CPU), random access memory (RAM), read-only memory (ROM), etc. The processing system may also include software resources, such as a basic input/output system (BIOS), a virtual machine monitor (VMM), and one or more operating systems (OSs). When the computer system is started or reset, it may load the BIOS, and then the VMM. The VMM may include a root OS, or it may run on top of a root OS. A root OS may also be referred to as a host OS. The VMM may create one or more virtual machines (VMs), and the VMs may boot to different guest OSs or to different instances of the same guest OS. The VMM may thus allow multiple OSs and applications to run in independent partitions.

The CPU in such a data processing system may provide hardware support (e.g., instructions and data structures) for virtualization. Additional details about virtualization may be found in reference manuals such as the following:
- Intel® Virtualization Technology Specification for the IA-32 Intel® Architecture, dated April 2005 (hereinafter "the VT-x Specification"); and
- IA-32 Intel® Architecture Software Developer's Manual, Volume 2B: Instruction Set Reference, N-Z, dated June 2006.

Other manufacturers may produce processors with different features for supporting virtualization. A processing system may also include features referred to as LaGrande Technology (LT), as developed by Intel Corporation. The LT features may provide for the protected measurement and launching of a VMM. Additional details concerning LT are provided in the publication entitled "The Intel Safer Computing Initiative: Building Blocks for Trusted Computing," which is currently available at http://www.intel.com/intelpress/validation100/secc/SECC_100Validation.pdf. For purposes of this disclosure, LaGrande Technology may also be referred to as Intel® Trusted Execution Technology (TXT). Additional details concerning Intel® TXT are provided in the publication entitled "Intel® Trusted Execution Technology: Preliminary Architecture Specification" and dated November 2006 (the "Intel® TXT Specification"). The Intel® TXT Specification is currently available from http://www.intel.com/technology/security/downloads/315168.htm.

In addition to RAM and one or more CPUs, a processing system may include a security coprocessor, such as a trusted platform module (TPM). A TPM is a hardware component that resides within a processing system and provides various facilities and services for enhancing the security of the processing system. For example, a TPM may be implemented as an integrated circuit (IC) or semiconductor chip, and it may be used to protect data and to attest to the runtime configuration of a platform. A TPM may be implemented in accordance with specifications such as the Trusted Computing Group (TCG) TPM Specification Version 1.2, dated Oct. 2, 2003 (hereinafter the "TPM specification"), which includes parts such as Design Principles, Structures of the TPM, and TPM Commands. The TPM specification is published by the TCG and is available from the Internet at www.trustedcomputinggroup.org/home.

In general, a TCG-compliant TPM provides security services such as attesting to the identity and/or integrity of the platform, based on characteristics of the platform. For instance, trusted computing technologies may provide facilities for measuring, recording, and reporting the software configuration of a platform. Specifically, the measurements may include load-time measurements of software. Unfortunately, load-time measurements do not always accurately reflect the runtime configuration of the system, due to unrecorded changes caused by system bugs or malicious attacks.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

As indicated above, load-time measurements do not always accurately reflect the runtime configuration of a system. The present disclosure describes example embodiments of a method and a system to support runtime measurement and reporting of the configuration of system components such as a VMM. The disclosed method for remeasuring a VMM may operate in a processing system that provides for the initial measurement and authentication of the VMM before launching the VMM. Since runtime measurement may follow an initial load-time measurement, runtime measurement may also be referred to as remeasurement.

To provide for remeasurement, this disclosure describes a VMM remeasurement agent (VRA), a method of provisioning a secret to the VRA with credentials, and a method of using this secret for measurement reporting. In an example embodiment, the VRA is placed within a system management interrupt (SMI) transfer monitor (STM) or a protected virtual machine managed by the STM. Alternatively, however, the VRA could reside within the VMM, as long as the VRA is protected from platform software, including the VMM. For example, the VRA could use runtime region-filtering technology or page-coloring technology to establish protections. The VMM provisions the VRA with a secret early in the VMM's initialization process, and then the VMM removes access to the secret and erases the secret from the VMM's memory.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, and other devices for processing or transmitting information.

Figure 1:
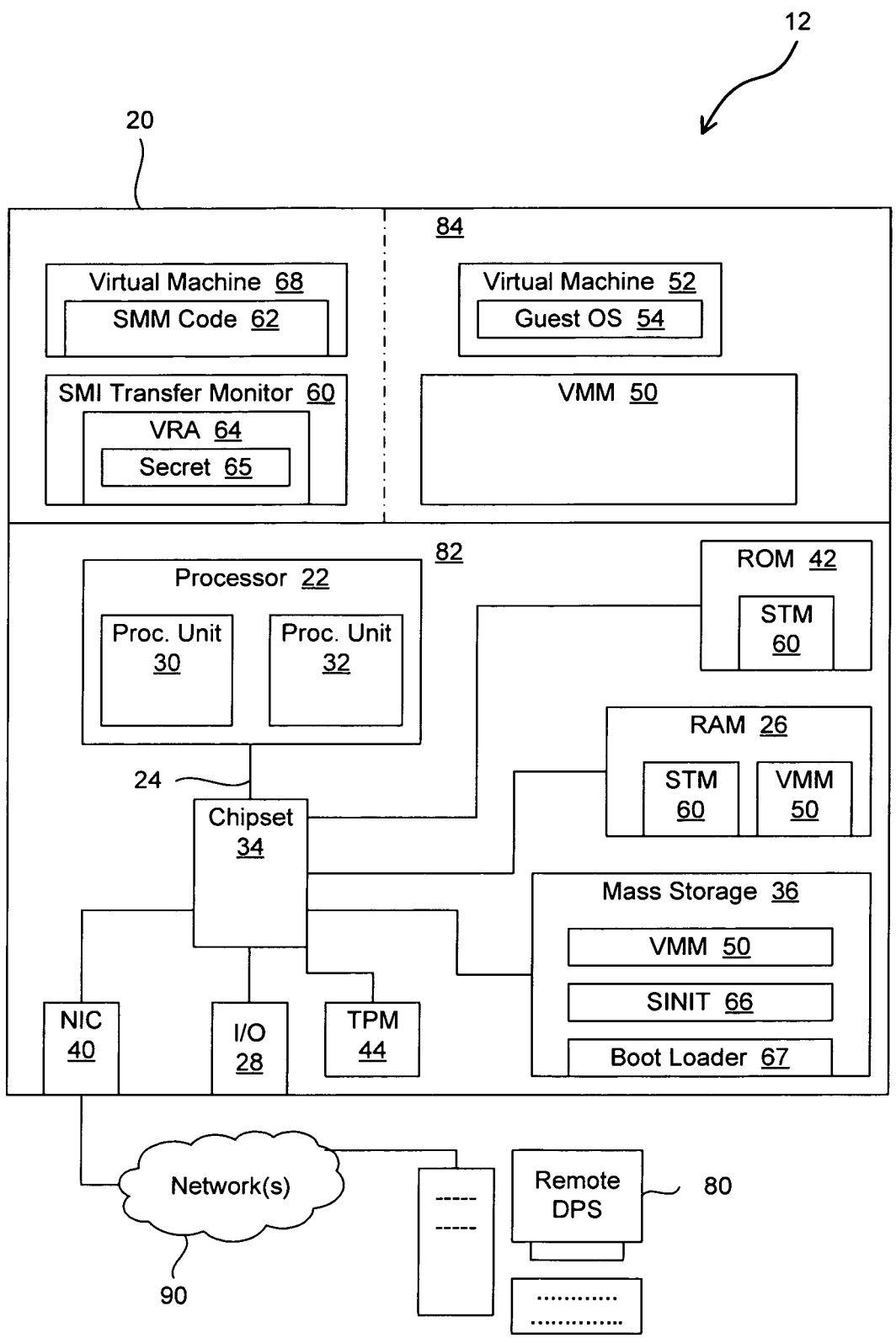
FIG. 1 is a block diagram depicting a suitable data processing environment in which certain aspects of an example embodiment of the present invention may be implemented.

FIG. 1 is a block diagram depicting a suitable data processing environment 12 in which certain aspects of an example embodiment of the present invention may be implemented. Data processing environment 12 includes a processing system 20 that has various hardware components 82, such as a CPU 22 and various other components, which may be communicatively coupled via one or more system buses 24 or other communication pathways or mediums.

This disclosure uses the term "bus" to refer to shared communication pathways, as well as point-to-point pathways. CPU 22 may include two or more processing units, such as processing unit 30 and processing unit 32. Alternatively, a processing system may include a CPU with one processing unit, or multiple processors, each having at least one processing unit. The processing units may be implemented as processing cores, as Hyper-Threading (HT) technology, or as any other suitable technology for executing multiple threads simultaneously or substantially simultaneously.

In the embodiment of FIG. 1, processor 22 is communicatively coupled to one or more volatile or non-volatile data storage devices, such as RAM 26, ROM 42, mass storage devices 36 such as hard drives, and/or other devices or media, such as floppy disks, optical storage, tapes, flash memory, memory sticks, digital video disks, etc. For purposes of this disclosure, the terms "read-only memory" and "ROM" may be used in general to refer to non-volatile memory devices such as erasable programmable ROM (EPROM), electrically erasable programmable ROM (EEPROM), flash ROM, flash memory, etc. Processor 22 may also be communicatively coupled to additional components, such as a video controller, integrated drive electronics (IDE) controllers, small computer system interface (SCSI) controllers, universal serial bus (USB) controllers, input/output (I/O) ports, input devices, output devices such as a display, etc. A chipset 34 in processing system 20 may serve to interconnect various hardware components. Chipset 34 may include one or more bridges and/or hubs, as well as other logic and storage components. In the example embodiment, processor 22 is communicatively coupled to a security processor such as TPM 44 via chipset 34.

Processing system 20 may be controlled, at least in part, by input from conventional input devices, such as a keyboard, a mouse, etc., and/or by directives received from another machine, biometric feedback, or other input sources or signals. Processing system 20 may utilize one or more connections to one or more remote data processing systems 80, such as through a network interface controller (NIC) 40, a modem, or other communication ports or couplings. Processing systems may be interconnected by way of a physical and/or logical network 90, such as a local area network (LAN), a wide area network (WAN), an intranet, the Internet, etc. Communications involving network 90 may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc. Protocols for 802.11 may also be referred to as wireless fidelity (WiFi) protocols. Protocols for 802.16 may also be referred to as WiMAX or wireless metropolitan area network protocols, and information concerning those protocols is currently available at grouper.ieee.org/groups/802/16/published.html.

Some components, such as the video controller for example, may be implemented as adapter cards with interfaces (e.g., a PCI connector) for communicating with a bus. In some embodiments, one or more devices may be implemented as embedded controllers, using components such as programmable or non-programmable logic devices or arrays, application-specific integrated circuits (ASICs), embedded processors, smart cards, and the like.

The invention may be described herein with reference to data such as instructions, functions, procedures, data structures, application programs, configuration settings, etc. When the data is accessed by a machine, the machine may respond by performing tasks, defining abstract data types or low-level hardware contexts, and/or performing other operations, as described in greater detail below. The data may be stored in volatile and/or non-volatile data storage. For purposes of this disclosure, the term "program" covers a broad range of software components and constructs, including applications, drivers, processes, routines, methods, modules, and subprograms. The term "program" can be used to refer to a complete compilation unit (i.e., a set of instructions that can be compiled independently), a collection of compilation units, or a portion of a compilation unit. Thus, the term "program" may be used to refer to any collection of instructions which, when executed by a processing system, perform a desired operation or operations.

The programs in processing system 20 may be considered components of a software environment 84. The software environment 84 may include BIOS components, system management mode (SMM) components, OS components, VMM components, user applications, etc.

As described in greater detail below, the BIOS may include an STM 60 and original equipment manufacturer (OEM) SMM code 62. STM 60 may include a VRA 64. The BIOS may progress through various phases during the boot process, and may then hand off to VMM 50. Alternatively, the BIOS may hand off to a host OS, and the host OS may then hand off to VMM 50. VMM 50 may then create one or more VMs 52 to support one or more guest OSs 54.

In the embodiment of FIG. 1, processor 22 supports a virtual machine extension (VMX) operating mode and a non-VMX operating mode. The non-VMX operating mode (and any similar operating mode in other processors) may be referred to as a normal operating mode, a legacy operating mode, or a virtualization disabled (VD) mode. The VMX operating mode (and any similar operating mode in other processors) may be referred to as a virtualization enabled (VE) mode. When processor 22 is set to the VE mode, processor 22 may operate in either a VMX root operating mode or a VMX non-root operating mode. Typically, hypervisors or virtual machine monitors such as VMM 50 execute in the VMX root operating mode, while guest VMs such as VM 52 execute in the VMX non-root operating mode. For purposes of this disclosure, the term "VMM operating mode" refers to the VMX root operating mode and any similar operating mode in other processors, while the term "VM operating mode" refers to the VMX non-root operating mode and any similar operating mode in other processors.

In the example embodiment, processing system 20 also includes LT features. In other embodiments, other technologies may be used to provide protected measurement and launching of VMMs.

The components in software environment 84 in FIG. 1 are arranged to illustrate a canonical software system architecture according to an example embodiment utilizing LT features. The illustrated architecture includes VMM 50, which can host one or more VMs 52. The architecture also supports an STM 60. STM 60 serves as a second peer monitor that can host one or more VMs 68 that execute in SMM. Because STM 60 executes in SMM, it is protected by the platform from tampering by VMM 50, as indicated by the dashed line separating the SMM environment from the non-SMM environment. In this architecture, STM 60 places SMM code 62 into VM 68, and constrains the access of SMM code 62 to platform resources, based upon the policy dictated by VMM 50. STM 60 also provides safe entry and exit from SMM mode caused by SMIs.

Figure 2:
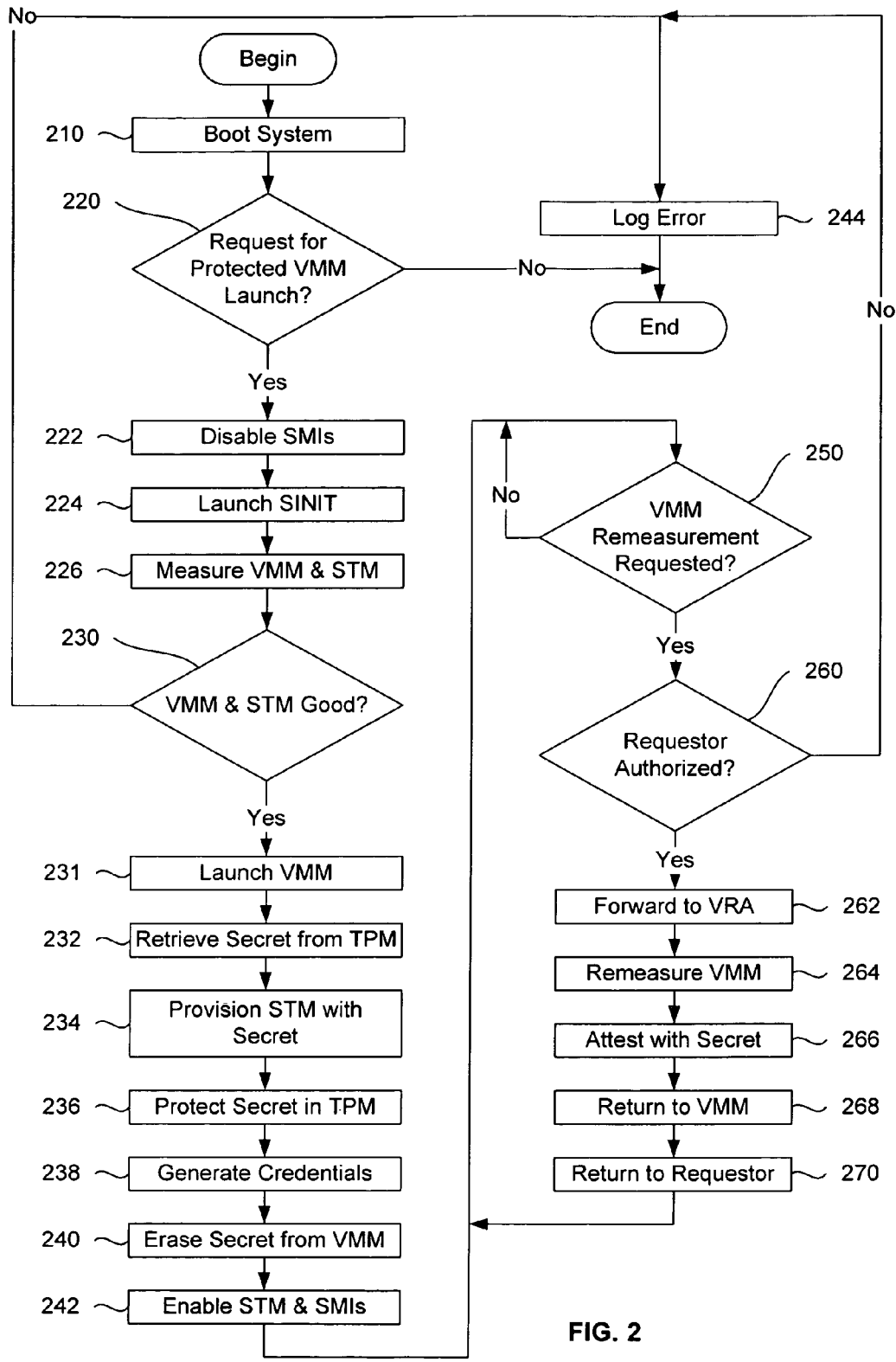
FIG. 2 is a flowchart of a process for remeasuring a VMM, according to an example embodiment of the present invention.

FIG. 2 is a flowchart of an example process for remeasuring a VMM, in the context of processing system 20. The illustrated process starts with processing system 20 being powered on or reset. As shown at block 210, processing system 20 then starts the boot process. For instance, BIOS components may be retrieved from ROM 42, loaded into RAM 26, and executed within software environment 84. The BIOS may be implemented, for instance, in accordance with Version 2.0 of the Unified Extensible Firmware Interface Specification, dated Jan. 31, 2006 (the "UEFI Specification"). The UEFI Specification is currently available from www.uefi.org/index.php?pg=4. Alternative embodiments of the present invention may use other types of boot processes.

As shown at block 220, after processing system 20 has booted, or during the boot process, processing system 20 may begin a process for launching a measured environment, or processing system 20 may launch an unmeasured environment. In the example embodiment, processing system 20 begins the process for launching a measured environment in response to execution of a GETSEC[SENTER] instruction. Accordingly, the steps for launching a measured environment may be referred to in general as SENTER operations or simply as SENTER. GETSEC[SENTER] may be invoked by a boot loader 67 or a host OS, for instance. However, before executing GETSEC[SENTER], the OS or boot loader 67 may load secure initialization (SINIT) instructions from nonvolatile storage (e.g., a hard drive) into RAM 26. Alternatively, after boot loader 67 places the SINIT code into RAM 26, processing system 20 may launch VMM 50, and then VMM 50 may relocate the SINIT code to an appropriate place into memory, perform SENTER configuration, and then execute GETSEC[SENTER]. Thus, the program attempting to execute the SENTER may be a boot loader that executes before any VMMs are launched, or it may be a VMM or any other suitable code that executes after the boot loader.

In the example embodiment, the SINIT instructions are implemented as an authenticated code (AC) module that resides in mass storage 36 or ROM 42. The SINIT code may include instructions for validating a measured VMM (MVMM). The GETSEC[SENTER] instruction may include operands or parameters that identify the SINIT code. The SINIT code and/or associated data may identify the VMM to be validated (e.g., VMM 50).

Additional details about the GETSEC[SENTER] instruction may be found in the Intel® TXT Specification. In embodiments for other architectures, instructions with similar characteristics may be used instead of GETSEC [SENTER] instructions.

Referring again to block 220, if the measured environment is not to be launched, the process shown in FIG. 2 may end without processing system 20 establishing a protected environment for a VMM. For instance, if processing system 20 has been configured to require an SENTER in order to enable VT capabilities, a VMM that does not perform an SENTER will not be able to enable VT capabilities. How that VMM responds to that limitation will be VMM specific.

However, if a measured environment is to be launched, the process for such a launch may proceed with processing system 20 disabling SMIs, as depicted at block 222. For example, the SENTER may cause microcode in the initiating logical processor (e.g., processing unit 30) to disable all interrupts including SMIs. The microcode may also signal the chipset to drain all pending direct memory access (DMA) transactions. The microcode may then send a signal to rendezvous all the processing units. The microcode may then measure, authenticate, and record a secure initialization or "SINIT" module 66. The microcode may then transfer control to SINIT module 66, as depicted at block 224.

SINIT module 66 may handle load-time measurement and initialization of the selected VMM (e.g., VMM 50). For example, SINIT module 66 may measure VMM 50 and STM 60, and may use those measurements to determine whether VMM 50 and STM 60 should be trusted, as shown at blocks 226 and 230. If SINIT module 66 determines that VMM 50 or STM 60 is not authentic, SINIT module 66 may log and/or display a suitable error message, as shown at block 244, and the process may then end without VMM 50 being launched. For instance, if the measurements indicate that the VMM has been modified, instead of launching that VMM, the boot loader may log the error and then (a) proceed, (b) attempt some remediation step, (c) reboot to safe mode, or (d) follow any other predetermined course of action. However, if SINIT module 66 is satisfied that the VMM and STM requirements have been met, SINIT module 66 may then hand off to VMM 50, as indicated at block 231.

In another embodiment, instead of having the SINIT module check the STM, the VMM is required to check that the STM is compatible or valid. For example, the VMM may inspect the measurement of the STM recorded in TPM 44. If the STM is not valid, then the VMM should take appropriate action (e.g. abort, boot into a safe mode, etc.). If it is acceptable, then the VMM should enable SMIs and initialize and launch the STM.

Once STM 60 has been validated and launched, and interrupts have been enabled, VMM 50 may begin a process of initializing VRA 64 by retrieving a secret value (e.g., private key) from TPM 44, as shown at block 232. This secret value may be referred to as the STM secret or the VRA secret. The VRA secret may have previously been sealed in TPM 44 to a locality, using the dynamic root of trust measurements for the environment "microcode/SINIT/VMM/STM." Or, VMM 50 may generate the VRA secret and use TPM 44 to seal the secret to the current environment. Accordingly, TPM 44 may require that processing system 20 have that same environment before it will release the VRA secret.

VMM 50 may then provide the VRA secret to STM 60, as depicted at block 234. For instance, once VMM 50 has been validated and launched, VMM 50 may initialize a shared memory area for communication with STM 60. This area of memory may be called the MVMM-STM interface structure. VMM 50 may then load the VRA secret into the shared memory area. VMM 50 may then load the physical address of the shared memory area into a register and then invoke STM 60. In the example embodiment, STM 60 is invoked by issuing a VMCALL instruction while in VMX root operation. This invocation may cause STM 60 to initialize itself and to extract the shared secret from the shared memory area. Specifically, the secret may go to VRA 64. Accordingly, FIG. 1 shows STM/VRA secret 65 within VRA 64. In the example embodiment, when STM 60 returns after initialization, SMIs are enabled.

Referring again to FIG. 2, after provisioning STM 60 with VRA secret 65, VMM 50 protects the VRA secret value within TPM 44 from further access, even by VMM 50, as shown at block 236. For example, one mechanism to augment the protection is for VMM 50 to extend the TPM platform configuration register (PCR) that contains the measurement of VMM 50 or STM 60 with a well known value. TPM 44 will then reject any unseal attempts until the system performs another SENTER.

Also, to provide for subsequent certification of remeasurements, VMM 50 may generate one or more credentials pertaining to VRA secret 65, as shown at block 238. In particular, VMM 50 creates a VRA credential that allows an evaluator to know that (a) the VRA secret was generated in a trustworthy manner and (b) the intended use of the VRA secret is to sign VRA measurements. As described in greater detail below, in the example embodiment, a VRA signing key (VSK) certificate serves as the VRA credential.

Credentials may be created in a number of different ways. In the example embodiment, the principals in the credentialing process are a corporate certificate authority (CA) and the VMM which has a VRA-certificate signing key. The process can be broken down into two parts: (1) generating a certificate for the VMM VRA-certificate signing key, and (2) generating a certificate for the VRA signing key.

For part 1, VMM 50 can generate a secret known as a VRA-certificate signing key during the initialization process of VMM 50. For instance, a TPM signing key may be sealed to VMM 50 early in the boot configuration, and VMM 50 may use that TPM signing key as the VRA-certificate signing key. At some point later, VMM 50 may use any suitable protocol to certify the TPM signing key with the corporate CA, thereby generating a VRA-certificate-signing-key (VCSK) certificate. The VCSK certificate, signed by the corporate CA, states that the VRA-certificate signing key is trusted to sign VRA keys.

For part 2, VMM 50 generates a VRA signing key, with VRA secret 65 serving as the private key portion of the VRA signing key. VMM 50 also signs the public portion of the VRA signing key with the VRA-certificate signing key generated in part 1, thereby creating a VSK certificate. Since the VRA-certificate signing key is sealed to the VMM configuration early in the boot process, it can only be used early in the boot process. The VSK certificate states that the VRA signing key is trusted to sign attestations.

Thus, VMM 50 generates a TPM signing key sealed to the VMM early boot configuration. Also, VMM 50 generates a VRA signing key, and signs the public portion of the VRA signing key with the TPM signing key generated earlier. At some point later, VMM 50 certifies the TPM signing key with the CA using any suitable protocol(s). Alternatively steps 1 and 2 can be combined.

Credentials such as the VSK certificate can then be provided to control software for VMM 50, for safe storage. This control software, which may be referred to as the VMM supervisor, may reside on top of the VMM, in a privileged virtual machine. Alternatively, the VMM supervisor may be implemented more or less as part of the VMM. The VMM supervisor may serve as the management software for VMM 50, supervising operations such as the enforcement of system policy and the management of system state. For instance, the VMM supervisor may determine which entities or components are authorized to request an attestation, and it may enforce a predetermined level of attestation granularity. The VMM supervisor may also manage the platform/VMM credentials used in the attestation.

In alternative embodiments, the VMM may generate credentials and/or cause the TPM to protect the VRA secret before provisioning the STM with the VRA secret.

As shown at block 240, after VMM 50 finishes initializing STM 60, VMM 50 may erase VRA secret 65 from the memory space of VMM 50. VMM 50 may then enable or launch STM 60, which may cause re-enablement of SMIs, as shown at block 242.

The initial measurement of VMM 50 may be followed after some time by one or more remeasurements. As described in greater detail below, if a remeasurement indicates that VMM 50 has not been tampered with, VRA 64 may attest to the remeasurement. VRA 64 may also be designed to inspect its measurements and take action, based on those inspections.

One method for runtime measurement is to provide a remeasurement agent that runs in a protected environment and is able to view the state of the software to be measured. A common approach is to use virtualization to provide a protected execution environment for the remeasurement agent. Other approaches are to use external coprocessor measurement tools, or to use SMM as described in the example embodiment.

After provisioning STM 60, VMM 50 may complete initialization. Once VMM 50 is operational, it exposes a remeasurement interface to the VMM supervisor. The VMM supervisor is responsible for authenticating and authorizing remeasurement requests from external entities.

Once the VMM remeasurement interface is invoked, VMM 50 may check that the specific caller is authorized, as indicated at blocks 250 and 260. If the caller is not authorized, an error message may be logged, as shown at block 244, and the process may end. If the caller is authorized, VMM 50 may forward the request to VRA 64, as shown at block 262.

VRA 64 may then calculate a new measurement of VMM 50, and may use VRA secret 65 to attest to that measurement, as shown at blocks 264 and 266. This attestation provides cryptographic proof that the attester (i.e., VRA 64) has possession of the VRA secret. For example, VRA 64 may provide this attestation in the form of a keyed cryptographic hash (e.g., a hashed message authentication code (HMAC)) where the VRA secret is the key, a cryptographic signature where the VRA secret is its private key, or any other message authentication mechanism based on the VRA secret.

As shown at blocks 268 and 270, STM 60 may provide the attestation and measurement to VMM 50, which may forward them to the caller. Alternatively, the measurements can be placed into an area of memory that VMM 50 can access. As indicated by the arrow returning to block 250, subsequent requests for remeasurement may also be processed according to the operations referenced above.

In the example embodiment of FIG. 1, VRA 64 running on processor 22 may use VRA secret 65 to perform runtime remeasurement and attestation without interacting with any separate co-processors.

In light of the principles and example embodiments described and illustrated herein, it will be recognized that the illustrated embodiments can be modified in arrangement and detail without departing from such principles. Also, the foregoing discussion has focused on particular embodiments, but other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, ROM, and RAM; and other detectable arrangements of particles manufactured or formed by a machine or device. Instructions may also be used in a distributed environment, and may be stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. A method for remeasuring a virtual machine monitor, the method comprising:
   using a virtual machine monitor (VMM) of a processing system to obtain a secret value from a trusted platform module (TPM) of the processing system;
   providing the secret value from the VMM to a measurement agent executing in a resource privileged mode of the processing system;
   generating a remeasurement value for the VMM while the VMM is in runtime;
   using the secret value that was obtained from the TPM to certify the remeasurement value; and
   communicating the remeasurement value to a requesting program.

2. A method according to claim 1, wherein the measurement agent comprises:
   a system management interrupt (SMI) transfer monitor (STM) that can create virtual machines to execute in the resource privileged mode.

3. A method according to claim 1, further comprising:
   using the VMM to verify the measurement agent before providing the secret value to the measurement agent.

4. A method according to claim 1, further comprising:
   after providing the secret value to the measurement agent, erasing the secret value from memory of the VMM.

5. A method according to claim 1, further comprising:
   receiving a VMM remeasurement request from the requesting program; and
   generating the remeasurement value for the VMM in response to the VMM remeasurement request.

6. A method according to claim 1, further comprising:
   determining whether the requesting program is authorized before communicating the remeasurement value to the requesting program.

7. A method according to claim 1, wherein the operation of using the secret value to certify the remeasurement value comprises:
   generating a hashed message authentication code (HMAC) for the remeasurement value; and
   using the secret value as a key for the HMAC.

8. A method according to claim 1, wherein the operation of using the secret value to certify the remeasurement value comprises:
   generating a cryptographic signature for the remeasurement value; and
   using the secret value as a private key for the cryptographic signature.

9. An apparatus comprising:
   a non-transitory machine-accessible medium; and
   instructions in the machine-accessible medium, wherein the instructions, when executed by a processing system, implement a virtual machine monitor (VMM) remeasurement agent to perform operations comprising:
   receiving a secret value from a VMM while the processing system is in a resource privileged mode, wherein the secret value comprises data obtained from a trusted platform module (TPM) of the processing system;
   generating a remeasurement value for the VMM while the processing system is in the resource privileged mode;
   using the secret value to certify the remeasurement value; and
   communicating the remeasurement value to a requesting program.

10. An apparatus according to claim 9, wherein the VMM remeasurement agent comprises:
    a system management interrupt (SMI) transfer monitor (STM) that can create virtual machines to execute in the resource privileged mode.

11. An apparatus according to claim 9, wherein the operations to be performed by the VMM remeasurement agent comprise:
    generating the remeasurement value for the VMM in response to a VMM remeasurement request from the requesting program.

12. An apparatus according to claim 11, wherein the operation of using the secret value to certify the remeasurement value comprises:
    generating a hashed message authentication code (HMAC) for the remeasurement value; and
    using the secret value as a key for the HMAC.

13. An apparatus according to claim 11, wherein the operation of using the secret value to certify the remeasurement value comprises:
    generating a cryptographic signature for the remeasurement value; and
    using the secret value as a private key for the cryptographic signature.

14. An apparatus according to claim 9, wherein:
    the instructions in the machine-accessible medium, when executed, also implement the VMM; and
    the VMM is operable to perform operations comprising:
        verifying the VMM remeasurement agent before providing the secret value to the VMM remeasurement agent;
        receiving a remeasurement request from the requesting program; and
        verifying the requesting program before passing the remeasurement request to the VMM remeasurement agent.

15. A method for remeasuring a virtual machine monitor, the method comprising:

initiating booting a processing system;
launching a first instance of a virtual machine monitor (VMM) of the processing system,
after initiating booting the processing system and before launching the first instance of the VMM, measuring the first instance of the VMM;
after launching the first the instance of the VMM, obtaining a secret value from a trusted platform module (TPM) of the processing system;
providing the secret value to a measurement agent executing in system management mode (SMM) of the processing system;
after launching the first instance of the VMM, generating a remeasurement value for the first instance of the VMM while the first instance of the VMM is in runtime mode;
using the secret value that was obtained from the TPM to certify the remeasurement value; and
communicating the remeasurement value to a requesting program.

16. A method according to claim 15, wherein the measurement agent comprises a system management interrupt (SMI) transfer monitor (STM) that can create virtual machines to execute in SMM.

17. A method according to claim 15, further comprising using the first instance of the VMM to verify the measurement agent before providing the secret value to the measurement agent.

18. A method according to claim 15, further comprising:
after providing the secret value to the measurement agent, erasing the secret value from memory of the first instance of the VMM.

* * * * *